July 13, 1948.  R. J. TINKHAM  2,445,046
APPARATUS FOR SHOWING PRESSURE
VERSUS VOLUME DIAGRAM Filed Jan. 22, 1944  5 Sheets-Sheet 1

Fig. 1.

Inventor
Russell J Tinkham.
by Charles H Will Attys.

July 13, 1948.

R. J. TINKHAM

2,445,046

APPARATUS FOR SHOWING PRESSURE VERSUS VOLUME DIAGRAM

Filed Jan. 22, 1944

Inventor
Russell J. Tinkham.
by Charles N. Sills
Attys

July 13, 1948.  R. J. TINKHAM  2,445,046
APPARATUS FOR SHOWING PRESSURE
VERSUS VOLUME DIAGRAM
Filed Jan. 22, 1944  5 Sheets-Sheet 4

Inventor
Russell J. Tinkham
by Charles H. Wills Attys.

July 13, 1948.   R. J. TINKHAM   2,445,046
APPARATUS FOR SHOWING PRESSURE
VERSUS VOLUME DIAGRAM
Filed Jan. 22, 1944   5 Sheets-Sheet 5

Inventor
Russell J. Tinkham
by Charles H. Hill Attys

Patented July 13, 1948

2,445,046

UNITED STATES PATENT OFFICE 2,445,046

APPARATUS FOR SHOWING PRESSURE VERSUS VOLUME DIAGRAM

Russell J. Tinkham, Chicago, Ill., assignor to Armour Research Foundation of Illinois Institute of Technology, a corporation of Illinois Application January 22, 1944, Serial No. 519,404

4 Claims. (Cl. 73—115)

This invention relates to improvements in apparatus for showing a pressure versus volume diagram for a reciprocating engine or equivalent structure. More particularly, the invention relates to a device which may for convenience be termed a volume sweep generator and its use with associated apparatus to produce quickly and accurately a visual pressure versus volume diagram, although the invention may have other uses and purposes as will be apparent to one skilled in the art.

When a reciprocating engine is developed, and sometimes at later intervals during its life, it is highly desirable to have a pressure versus volume indicator diagram available to determine facts concerning the operation of that engine. Such a diagram denotes the frequency of the engine, gives facts concerning the valve action of the engine, the compression of the engine, shows undue restriction in air cleaners in connection with multi-cycle engines, denotes facts concerning the back pressure in mufflers used with the engine, etc. Heretofore, it was substantially impossible to obtain such data concerning each specific engine coming off a production or assembly line, such as is common in the manufacture of automotive engines in great quantity, owing to the necessary complicated, tedious, and highly expensive procedure that would be involved were such data formulated in connection with each engine on the line. The best that could be done, therefore, was to run rather exhaustive tests on certain engines only, with the idea in mind that all other engines constructed in accordance with the same specifications as those tested would function sufficiently close to the tested engines for practical purposes. Further, it has been heretofore unduly difficult to obtain a substantially accurate pressure versus volume indicator diagram for any reciprocating engine, and it has always been desirable to materially simplify that process. Highly skilled operators were also essential in order to interpret the functioning of an engine and salient facts concerning its operation from a pressure versus volume indicator diagram.

With the foregoing in mind, it is an important object of the instant invention to provide means sufficiently economical and which may be used sufficiently facilely to warrant the production of a pressure versus volume indicator diagram for each and every engine in a production line.

Another object of the invention is the provision of means so arranged as to give at a glance a pressure versus volume indicator diagram for a reciprocating engine.

Another object of the invention resides in mechanism for furnishing a pressure versus volume indicator diagram for a reciprocating engine, which diagram is as accurate as is necessary for a particular job, the accuracy depending upon the construction of a certain part of the mechanism.

It is also a feature of this invention to provide an arrangement for visually showing at a glance a pressure versus volume indicator diagram for a reciprocating engine, and presenting that diagram in such a manner that even a relatively inexperienced operator can tell at a glance whether or not that engine is operating satisfactorily.

Another highly important object of the instant invention is to provide an arrangement for furnishing a pressure versus volume indicator diagram for a reciprocating engine, in which the diagram is a substantially accurate and actual diagram for a particular engine, and the arrangement is suitable not only for solid piston engines but also for flexible piston engines where the volume is not the same on the downstroke as on the upstroke for the same intermediate location of the piston.

It is a further feature of the invention to provide an arrangement for presenting a pressure versus volume diagram for a reciprocating engine, and which arrangement is good for all engines from the same assembly line, or for all engines which the particular manufacturer intends to be substantially identical.

Also a feature of the invention resides in the provision of mechanism for providing a pressure versus volume diagram of an engine, in which mechanism the most changeable item of equipment results from measured data which, if made with reasonable accuracy, should suffice for a long run of engines intended by the manufacturer to be alike.

Still a further object of the invention resides in the provision of apparatus for use with a cathode ray oscilloscope to show a fluorescent trace in the shape of an actual pressure versus volume diagram for that particular engine.

It is a further object of the invention to provide apparatus for visually indicating a pressure versus volume diagram for a particular engine, in such a manner that engine characteristics may be determined at a glance from the diagram, and yet the diagram or data provided by it may be easily recorded if so desired, but in ordinary practice such recording will seldom be necessary unless a manufacturer wants to keep particular records of every individual engine made.

Another important object of the invention is to provide an apparatus for providing a visual pressure versus volume diagram for an engine in which only one part of the equipment need be specifically arranged for the apparatus to function with an engine made under different specifications.

While some of the more salient features, characteristics and advantages of the instant invention have been above pointed out, others will become apparent from the following disclosures, taken in conjunction with the accompanying drawings, in which.

As shown on the drawings.

Figure 1:
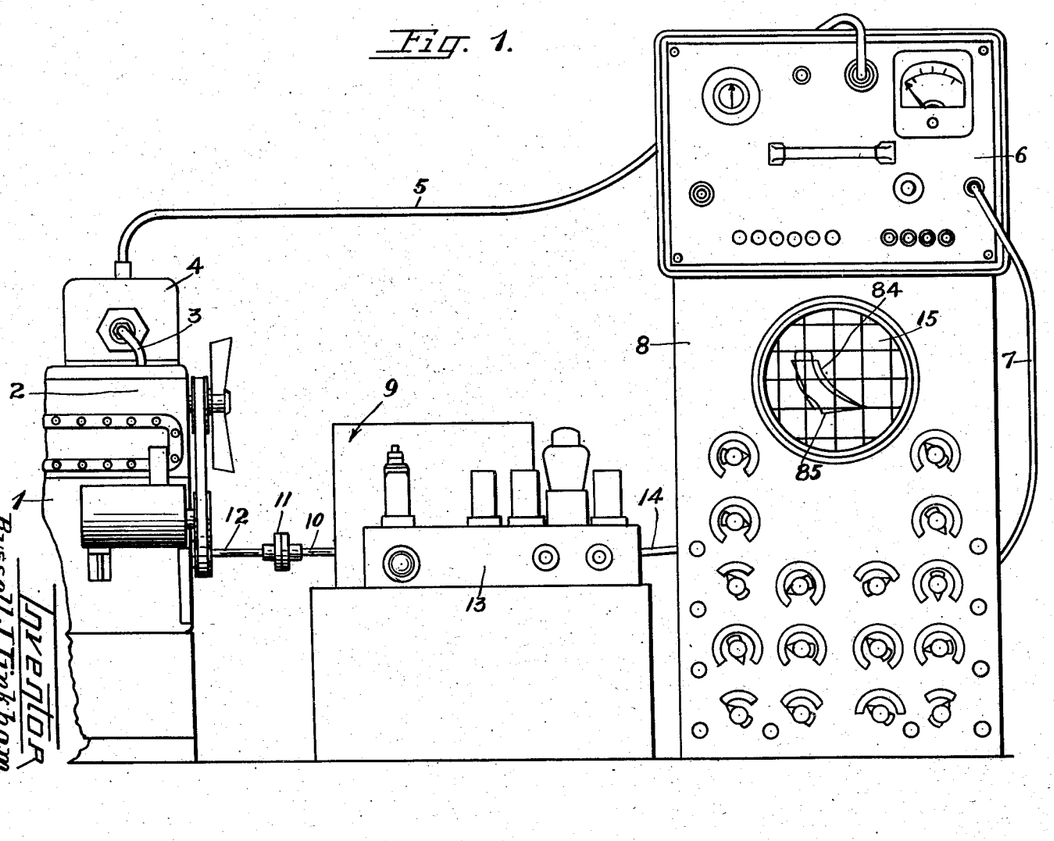
Figure 1 is a fragmentary schematic layout of equipment connected to provide a visual pressure versus volume diagram for a reciprocating engine, the apparatus embodying principles of the instant invention.

In Figure 1 there is shown a general assembly of apparatus capable of producing a visual pressure versus volume diagram of a reciprocating engine, and is highly desirable for use with a high speed reciprocating engine. The indicating diagram is shown directly as a fluorescent trace on a cathode ray oscilloscope screen.

In the use of the present invention, for best and most complete results, it is desirable to obtain a diagram for each cylinder of the engine, if the engine is a multi-cylinder structure. In some instances, it may be possible to work on the assumption that all cylinders perform alike, and therefore it is only necessary to obtain a diagram for one of the cylinders. However, it requires little more time to obtain a diagram for each of the cylinders and obviously such procedure results in a better complete picture of the functioning of the particular engine. It is not necessary in quantity manufacture of engines, however, to alter the device for each engine cylinder. The small amount of error occurring between the volume of one cylinder and that of another, where all cylinders are intended to be identical, is so small as to be negligible.

Referring now to Figure 1 a portion of a reciprocating engine 1 is shown and in this instance a cylinder 2 of that engine is under test. Connected to the cylinder by a suitable conduit 3 is a pressure pick-up device 4 which may be a commercially available transducer. As a specific example, this device may be designed to measure pressure from 0.1 pound per square inch to 1,000 pounds per square inch over a frequency range from 5 to 2,000 cycles per second, and the voltage output of the device may be proportional to pressure somewhere within this range and may equal approximately 0.03 peak volt for each pound per square inch of pressure when operated into an impedance of substantially 10 megohms. Such a device may be purchased on the open market.

The pressure pick-up 4 is connected through a pair of conductors contained within a shielded cable 5 to a commercially available voltage amplifier 6, preferably either an alternating current or a direct current vacuum tube amplifier having negligible or zero phase shift between input signal and amplified output signal. It may be desirable to use an alternating current amplifier for high speeds and a direct current amplifier for low speeds, such as below 10 cycles per second.

The output of the voltage amplifier 6 may be connected through a suitable cable 7 directly to the vertical deflection plates of a cathode ray oscilloscope 8. This oscilloscope may be of any suitable type if properly connected with the rest of the apparatus. As a specific example a cathode ray oscilloscope having all deflection plates isolated will give highly satisfactory and very flexible results. Such an instrument may also be obtained on the open market.

The internal moving part of a device termed for convenience a volume sweep generator and generally indicated by numeral 9 is connected by means of a shaft 10, a coupling 11, and another shaft 12, to the crankshaft of the engine 1. This device 9 will be more fully later described herein. The volume sweep generator 9 may be electrically connected with a vacuum tube voltage amplifier 13, preferably an amplifier with a self-contained power supply. As a specific example, a two stage resistance coupled voltage amplifier having the same general characteristics as the amplifier 6 is satisfactory. The output of this amplifier is directly connected through a suitable cable 14 with the horizontal deflecting plates of the oscilloscope 8.

When the apparatus is energized and the engine 1 is in operation, a fluorescent trace in the form of a pressure versus volume indicator diagram will appear on the screen 15 of the oscilloscope. That cathode trace may be centered properly on the screen by a variable tap on the bleeder resistor of the power supply for the amplifier 13. In the event it is desired to enlarge any part of the fluorescent trace or diagram for detailed study the amplifier 6 should, of course, have sufficient voltage gain for that purpose.

It should also be appreciated that while in Figure 1 the entire apparatus has been illustrated in a rather spread out manner for the purpose of clarity, all of the apparatus save the pressure pick-up 4, the cable 5, the mechanical connection through the coupling 11, and the customary connection to a suitable source of power supply, may be included in a single portable container. In such a container, it is only necessary to provide ready access to the volume sweep generator 9 so that this generator may be altered in a manner to be later described to accommodate engines of different types, sizes, or built under different specifications.

Figure 2:
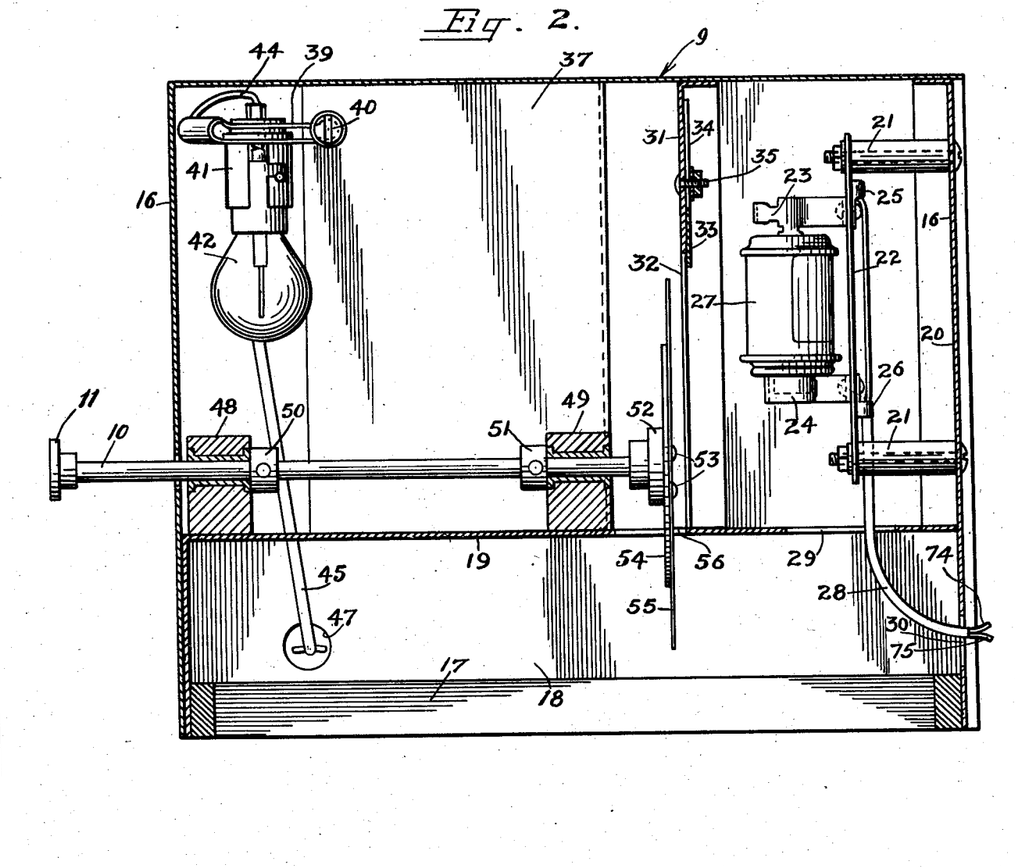
Figure 2 is an enlarged fragmentary central vertical sectional view, with parts shown in elevation, of a portion of the apparatus of Figure 1, namely that portion which might for convenience be termed a volume sweep generator, seen in the central part of Figure 1.
Figure 3:
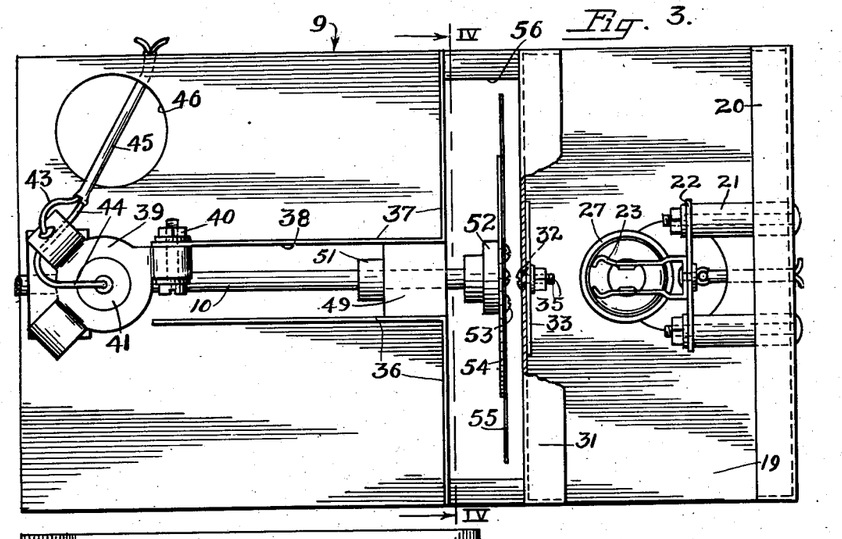
Figure 3 is a top plan view of the structure of Figure 2, with parts broken away and with the casing removed.
Figure 4:
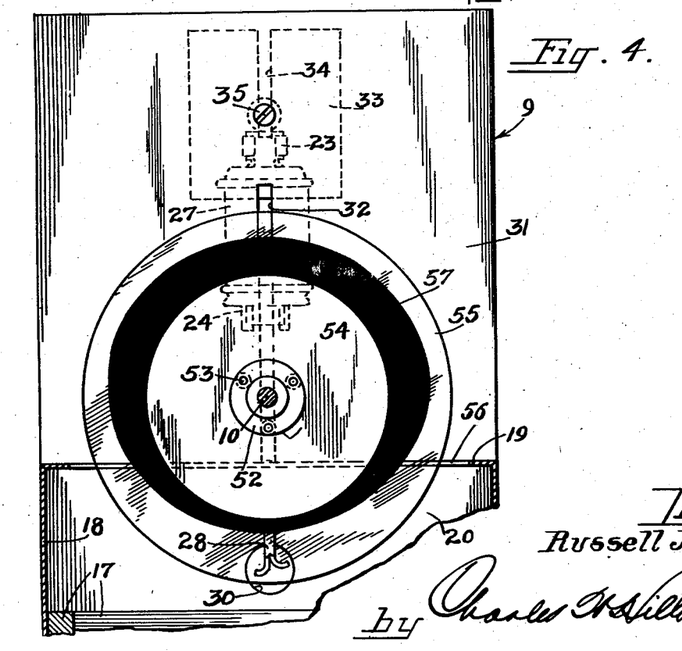
Figure 4 is a fragmentary vertical sectional view taken substantially as indicated by the line IV—IV of Figure 3, looking in the direction of the arrows.

With reference to Figures 2, 3 and 4, it will be seen that the volume sweep generator 9 includes a suitable casing or cover 16 arranged to enclose three sides and the front of the apparatus, although this cover may be constructed in any manner suitable for the purpose. The structure enclosed within the cover 16 includes a bottom strengthening frame 17 to which is secured a suitable side wall formation 18 carrying a transverse partition 19 completing a structure in the nature of an inverted box. The back partition 20, however, extends substantially the full height of the device. The inside of the casing 16 and the surfaces of all partitions within the casing are preferably painted flat black, and the casing is preferably lightproof. Any apertures in the casing wall through which electrical conductors or shafts extend may be treated in any suitable manner to render them lightproof, if necessary.

Carried by suitable supports 21 extending inwardly from the rear wall 20 is a bracket arrangement including a backing member 22 bearing a pair of vertically spaced resilient clamps 23 and 24 provided with terminal connections 25 and 26 respectively. The clamps removably support a suitable photoelectric tube 27, the conductive clamps engaging the terminals of the tube. A cable 28 containing separate conductors connected to the terminals 25 and 26 extends through an opening 29 in the floor platform 19 and out through an opening 30 in the rear wall 20 of the housing for connection to the aforesaid amplifier 13.

Disposed in front of the photo-electric tube 27 is an upright partition 31 which extends entirely across the casing so as to black out all light from the opposite side of the partition from the photoelectric tube 27, with the exception of that light passing through an optical slit 32 in the partition 31. This optical slit is relatively elongated and narrow, extending in a vertical direction in front of the photo-electric tube. On the back of the partition 31 above the optical slit is an opaque slide 33 provided with a suitable slot 34 for engagement over the shank of a securing bolt 35 by means of which the slide may be raised and lowered to vary the height of the optical slit as may be required. It will be understood that the width and length of the optical slit may be each independently variable by means of conventional optical slit jaws, if so desired.

With reference more particularly to Figure 3, it will be seen that a pair of angle partitions 36 and 37 extending from the floor partition 19 to the top of the housing are disposed in front of the partition 31 containing the optical slit. The sides of these partitions 36 and 37 extending longitudinally of the casing are in spaced relation to each other to define therebetween a light channel 38 through which light from a source to be later described may pass toward the optical slit and through the optical slit to the photo-electric tube 27.

At the forward end of the channel 38, a bracket 39 is secured to the partition 37 as indicated at 40. This bracket supports a socket 41 for an incandescent lamp 42 which provides a source of light to maintain the photo-electric tube 27 active during operation. It has suitable electrical conductors 43 and 44 to connect the socket 41 to any suitable source of electrical energy. These conductors may be enclosed in a cable 45 extending through an opening 46 in the floor partition 19 and exiting through another opening 47 in the side wall of the housing.

So far, the described structure of the volume sweep generator 9 is a relatively fixed structure, and remains so fixed during the use of the device, except for possible adjustment and replacement of parts when necessary. The movable parts of the volume sweep generator are designed to vary the amount of light received by the photo-electric tube 27 from the light source 42 in keeping with variations in cylinder volume of the particular engine under test throughout the piston cycle, and thus produce upon the cathode ray screen of the oscilloscope a pressure versus volume indicator diagram of that particular engine.

These moving parts include the aforesaid shaft 10 which extends through an opening in the front wall of the casing 16 and passes through a pair of bearing mountings 48 and 49 on the floor partition 19, collars 50 and 51 being utilized to maintain the shaft in a proper position of adjustment. As seen best in Figure 2, the shaft 10 extends through the light channel 38 beneath the light source 42 to a position adjacent the partition 31 containing the optical slit. The inner end of the shaft carries a suitable holding collar 52 into which is engageable a plurality of attaching screws 53. This structure holds in place an opaque, preferably metallic, disc 54 and another disc 55, which discs extend through a suitable slot 56 in the floor partition 19. It will be noted that the opaque disc 54 is on the side near the light source.

Figure 6:
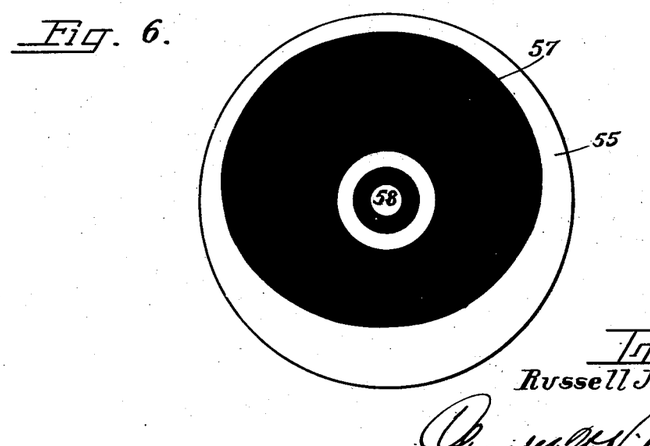
Figure 6 is a face view of the finished part made in accordance with the teachings of Figure 5.

The disc 55 is preferably of substantially transparent material such, for example, as celluloid or photographic film stock. This disc 55 as best seen in Figures 4 and 6 has an opaque area 57 thereon, which area is eccentrically disposed relatively to the shaft 10. The disc itself is symmetrical about the shaft 10, that is the shaft 10 extends through the exact center of the disc in the preferred construction, so that the rotating apparatus will always be in balance. The eccentric opaque area 57 may be painted upon the disc, or in the event it is a photographic film the opaque area may be provided thereon by conventional photographic technique.

It will be noted that the disc 55 is disposed adjacent the partition 31 in a parallel plane therewith, and overlies the major portion of the optical slit 32. In order to maintain the photo-electric tube 27 energized properly at all times there will be a relatively short portion of the optical slit above the disc 55 and below the adjusting slide 33 always open, as seen in Figure 4, so that some light from the source 42 always reaches the photoelectric tube. In a preferred arrangement, it is desirable to have the disc 55, partition 31, and photo-electric tube 27 as close together as is reasonably feasible.

The opaque portion 57 of the disc 55 is so designed that when the disc is rotated in front of the optical slit, the effective length of the slit is varied from a maximum to a minimum value in direct proportion to the changes of volume of the cylinder under test during rotation of the crankshaft of the particular engine. As stated above, the shaft 10 of the volume sweep generator is coupled to the engine crankshaft so as to be driven at the same speed as the crankshaft of the engine under test. If so desired, a gear train may be employed, and a multiple or sub-multiple of the engine speed may be used. Accordingly, as the volume of the particular cylinder changes during the travel of the piston through its reciprocation cycle the effective part of the optical slit is proportionately varied in size and the photo-electric tube is correspondingly affected.

For engines of different sizes or of different types, different discs 55 must be used. For all cylinders or all engines intended to be identical by the manufacturer, the same disc may be used throughout the testing of the entire run of engines, but a different disc must be used for engines of different sizes or types. Most frequently, however, there will be a relatively large number of engines intended to be identical produced by a manufacturer. This is especially true in the automotive industry. Consequently, the work necessary to produce or make a disc 55 for a particular engine cylinder, while possibly prohibitively expensive except in cases of special tests or research work insofar as a single cylinder is concerned, is absorbed in the testing of a complete line or run of identical engines so there is but an infinitesimal amount of that work attributable to the testing of each engine.

The making of the masking disc 55 for a run of engines should be done with due care and caution. A preferred method of making this disc includes first determining the cylinder volume at various degrees of crank angle in whatever increment may be predetermined, depending upon the desired accuracy of result. For very accurate work, the cylinder volume may be determined in increments of one degree of crank angle, and for slightly lesser accuracy but which may be satisfactory for most cases, the cylinder volume could be determined in increments of 5 degrees of crank angle. That is, the volume of the cylinder is determined as it varies by virtue of the movement of the piston therein at specified increments during one revolution of the crankshaft.

Certain other data must be at hand including the maximum dimension of the photo-tube photo-sensitive plate, the maximum and minimum values of the cylinder volume, and the distance from the center of the photo-tube photo-sensitive plate to the center of rotation of the masking disc. With these figures the radius of the resulting masking disc may readily be determined for the particular volume sweep generator.

Figure 5:
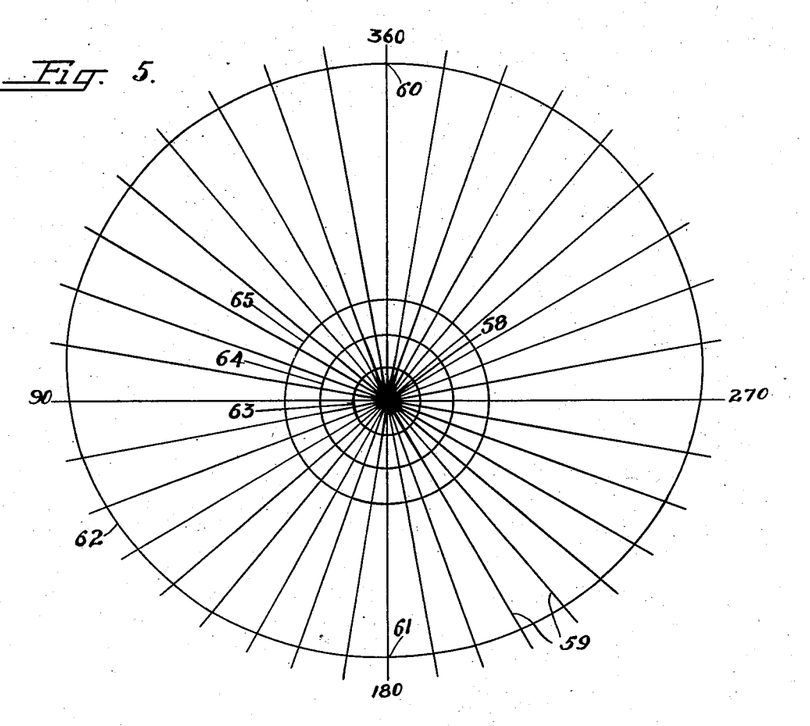
Figure 5 is a schematic diagram illustrating a step in the making of one of the parts of the apparatus seen in Figures 2, 3 and 4.

A large chart is then made on which the rotating center of the ultimate disc is used as the center of the chart, as indicated at 58 in Figure 5. Emanating from this center are radii lines 59, one for each of the selected increments of crank rotation. Knowing the ultimate required size of disc, the various cylinder volumes are plotted on each of the radii lines 59 by simple arithmetic proportions, starting with the larger volume at point 60 in Figure 5 corresponding to zero or 360°. The cylinder volume will then become less until at point 61, or 180°, the smallest volume occurs, and from this point back to the starting point the volume again gradually increases. A curve 62 is drawn through the points thus plotted, the curve being made as smoothly as possible. It is better during the preparation of the chart to put in a central circle 63 to mark the center of rotation of the ultimate masking disc. In order to clearly and easily establish this center two other circles concentric with the circle 63 may also be drawn as indicated at 64 and 65. After the circle 62 has been made, the portion on the chart between the circle 62 and the circle 65 may be inked or painted, preferably black. The space between the circles 63 and 64 may likewise be treated. Care should be taken so that the outline of the blackened area will be smooth.

By making such a chart much larger than will ultimately be used, small variances in the blackened area 57 will be rendered substantially unnoticeable when the large chart is photographically reduced. The large chart may be photographed with the aid of a suitable camera to the desired size, depending upon the required resultant size of the masking disc. The negative is developed, and a positive contact print made from that negative on photo-sensitive material backed upon any desired transparent or translucent backing material, such as Celluloid, standard photographic film, glass plastic, etc., coated with a photo-sensitive emulsion. In the photographic technique employed, it is desirable to obtain as much contrast as possible and good definition.

From the finished positive a circular masking disc 55 of the proper radius is cut using the rotation center point 58 as the center of the masking disc, thus leaving the darkened area 57 eccentrically disposed on the disc, as seen best in Figure 6. This finished masking disc may then be punched centrally to accommodate the shaft 10, and secured in position as seen in Figures 2, 3 and 4 against the opaque disc 54.

It is not necessary to follow the above described method specifically, because the negative itself may be used as the masking disc. In that event, the area 57 would be substantially transparent, and there would be a darkened border therearound. It makes no real difference if the eccentric portion 57 is dark or light and the boundary therearound light or dark respectively, as the disk varies the amount of light falling on the photo cell, and such variation may be in either direction without affecting the operation of the device. The same masking disc may be used for all engine cylinders intended by the manufacturer to be identical. If an engine having cylinders of different type or different size is to be tested, a new masking disc must be made to fit those different cylinders, if reasonable accuracy is desired.

Figure 9:
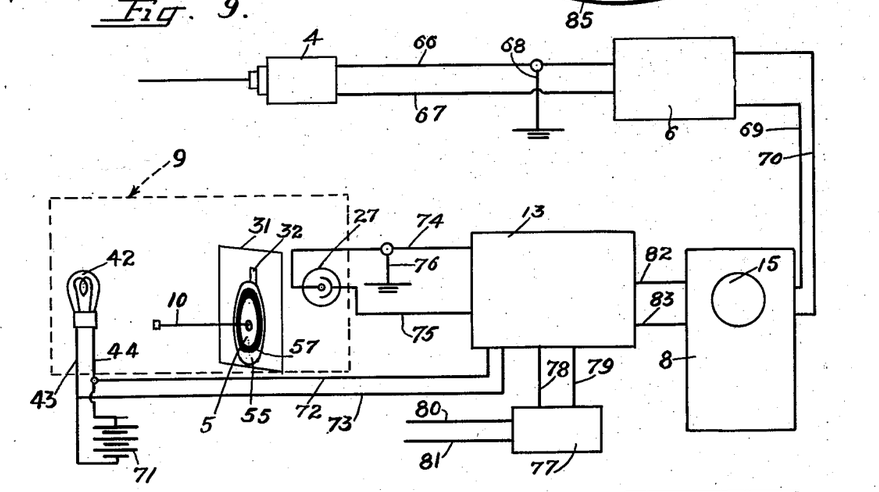
Figure 9 is a schematic wiring diagram, with certain parts distorted for purposes of clarity, showing the connections for the apparatus of Figure 1.

In Figure 9 I have illustrated diagrammatically a wiring diagram for the apparatus shown mainly in Figure 1. It will be seen that the pressure pick-up device 4 is connected through a pair of conductors 66 and 67 to the voltage amplifier 6. These conductors are contained within the cable 5 of Figure 1, which cable is shielded as indicated at 68 in Figure 9 to eliminate any undesirable effects from outside disturbances. The voltage amplifier 6 is connected through conductors 69 and 70, contained within cable 7, to the vertical deflecting plates of the oscilloscope 8. A dotted line encloses the structure contained within the volume sweep generator 9 for purposes of clarity. The light source 42 is connected through conductors 43 and 44 to a suitable source of energy such as a battery 71. Conductors 72 and 73 tap the conductors 43 and 44 respectively and lead into the voltage amplifier 13. The photo-electric tube 27 is connected by way of conductors 74 and 75, contained within the cable 28, to the voltage amplifier 13, the cable 28 also being shielded as indicated at 76. The voltage amplifier, as stated above, is preferably of the type carrying its own power supply, but in Figure 9, for purposes of clarity, the power supply has been shown separate from the amplifier. In this figure, the power supply is indicated by numeral 77 and is connected to the voltage amplifier by conductors 78 and 79. Conductors 80 and 81 lead from the power supply to any suitable source of energy such, for example, as 110 volt 60 cycle alternating current which may easily be had by way of any convenience outlet. The voltage amplifier 13 is connected by way of conductors 82 and 83 to the horizontal deflecting plates of the oscilloscope 8 so as to provide the volume sweep in the resultant fluorescent trace.

Figures 7, 8:
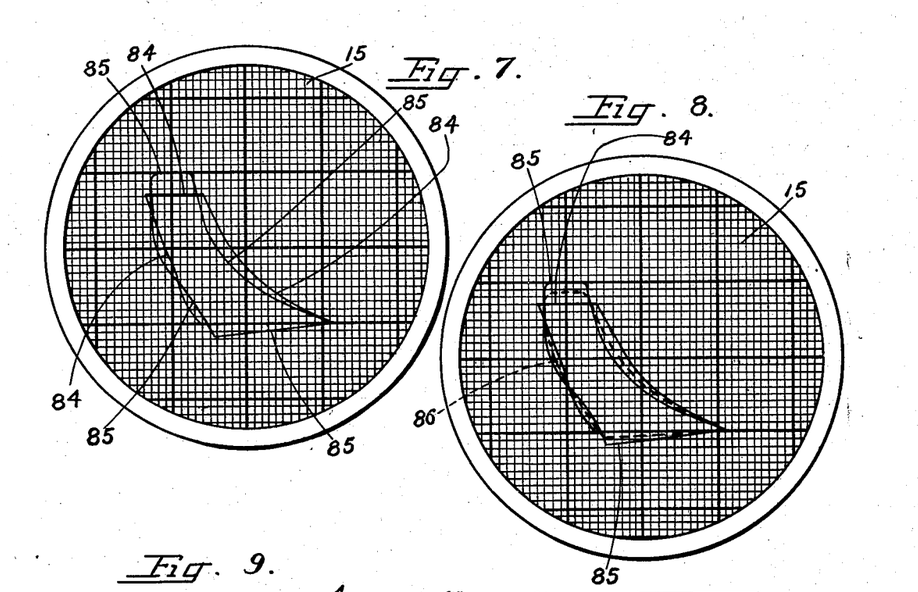
Figure 7 is an enlarged front view of the cathode ray screen of the oscilloscope of Figure 1.
Figure 8 is a view similar to Figure 7 illustrating the showing of a fluorescent trace resulting from the use of the present invention.

As seen best in Figures 7 and 8 the cathode ray screen 15 of the oscilloscope is provided with graph markings either by etching such graph upon the glass of the oscilloscope or by way of securing a piece of substantially transparent graph paper to the oscilloscope screen. Also provided upon the oscilloscope screen is a pair of permanent engine indicator diagrams. Numeral 84 indicates an indicator diagram or pressure versus volume curve that denotes substantially ideal or perfect operation of the engine cylinder. This curve is theoretically perfect for a particular engine and it is not to be expected that the fluorescent trace made under test of that engine will equal diagram 84. Reference numeral 85 indicates the minimum tolerable diagram for the class of engine under test. In other words, this pressure versus volume curve is the poorest that will be allowed for the particular class of engines being examined. The diagrams 84 and 85 are put on with any suitable form of paint or ink and remain in permanent position.

Accordingly, if the fluorescent trace appearing upon the screen 15 of the oscilloscope when an engine cylinder is under test falls between the diagrams 84 and 85 the operation of that engine cylinder is satisfactory. Accordingly, it will be at once noted that an expert eye is not necessary for the testing or examining of a series of engines upon an assembly line, because even an unskilled operator is capable of telling whether or not the fluorescent trace falls between the perfect diagram and the minimum tolerable diagram. It is not essential that that operator even know all the information available from an indicator diagram. On the other hand, if the test is made in research work or is a special test, a skilled analyst may be used to examine the fluorescent trace from which he can tell the efficiency, the compression, the possible valve action, undue restriction in an air cleaner, back pressure in mufflers, etc. In Figure 8 I have indicated a curve 86 in dotted lines, as exemplary of a fluorescent trace appearing upon the cathode screen of the oscilloscope and which falls satisfactorily between the ideal curve 84 and the minimum allowable curve 85. The dotted curve 86 would indicate that the cylinder under test was sufficiently satisfactory for commercial purposes.

In operation the instant invention is extremely simple, economical, and highly efficient. Assume that tests are to be made of a series of engines intended to be idenitcal coming down a production line. The apparatus of Figure 1 may be disposed adjacent to termination of that production line so as to meet each engine that is considered finished. Assuming again that the engines are multi-cylinder engines, it is a simple expedient to connect the shaft 10 of the volume sweep generator 9 to the crankshaft of the engine, and then connect the pressure pick-up 4 to the first cylinder of the engine. When the engine is operated, a fluorescent trace which is a substantially true pressure versus volume diagram of that engine will appear upon the screen 15. If that trace falls between the curves 84 and 85, that particular cylinder is satisfactory. Such operation requires only a very small interval of time. Upon the completion of that test, the pressure pick-up 4 is connected to the next engine cylinder and the shaft 12 is shifted relatively to the crankshaft of the engine to maintain the proper phase relationship between the pressure and volume changes in the cylinder. In that manner, each successive engine cylinder is examined, and in like manner the following engine is tested.

Of course, it is to be understood that a masking disc 55 has been made for the particular engines under test. If the same apparatus is to be used upon another production line making engines of different types or different sizes, a masking disc for that particular type or size of engine must be installed in the volume sweep generator 9.

It will be especially noted that the apparatus will work equally as well for single cylinder engines as for multi-cylinder engines, and equally as well for flexible pistons as rigid pistons. In connection with flexible pistons, it will be noted that the cylinder volume on the downstroke is not the same as it is on the corresponding location of the piston on the upstroke, but such variations will all appear on the eccentric portion of the masking disc and will be accurately reproduced in the fluorescent trace on the oscilloscope screen.

From the foregoing, it is apparent that I have provided novel, economical, and highly efficient means for obtaining a substantially true and actual pressure versus volume indicator diagram for engines, the invention being so economical in construction and use as to warrant the testing or examining of each cylinder of each engine in a production line, and this is especially true because in such work the labor amounts to little and the services of a skilled operator for taking the readings are not necessary. It will also be noted that I have developed a new and novel method of producing a salient part of the apparatus which is sufficient for all engine cylinders intended by the manufacturer to be identical. Substantially any degree of accuracy may be obtained depending upon what care is expended in the making of the masking disc.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In apparatus for producing a visible pressure versus volume indicator diagram for an engine, an oscilloscope, a pressure pick-up connectable with a cylinder of an engine under test and with one set of deflection plates of said oscilloscope, a photo-electric tube connected with the other set of deflection plates of said oscilloscope, a source of light for said tube, and means arranged proportionately to changes in cylinder volume during a piston cycle connectable to the crankshaft of the engine under test to be rotated thereby and positioned to vary the light from said source on said tube, said means being in the form of a masking member permeable to light having an opaque area eccentrically disposed relatively to the operating center of said member and which area has an outline in the nature of a curve varying in accordance with volume changes in the engine cylinder during movement of the piston.

2. In apparatus for producing a visible pressure versus volume indicator diagram for an engine, an oscilloscope, a pressure pick-up connectable with a cylinder of an engine under test and with one set of deflection plates of said oscilloscope, a photo-electric tube connected with the other set of deflection plates of said oscilloscope, a source of light for said tube, and means arranged proportionately to changes in cylinder volume during a piston cycle connectable to the crankshaft of the engine under test to be rotated thereby and positioned to vary the light from said source on said tube, said means being in the form of a masking disc having a substantially transparent portion and an opaque portion, one of said portions being eccentrically disposed relatively to the operating center of the disc with its outline varying proportionately to volume changes in the cylinder of the engine under test.

3. In apparatus for producing a visible pressure versus volume indicator diagram for an engine, an oscilloscope, a pressure pick-up connectable with a cylinder of an engine under test and with one set of deflection plates of said oscilloscope, a photo-electric tube connected with the other set of deflection plates of said oscilloscope, a source of light for said tube, and means arranged proportionately to changes in cylinder volume during a piston cycle connectable to the crankshaft of the engine under test to be rotated thereby and positioned to vary the light from said source on said tube, said means being in the form of a disc of photographic film having a substantially transparent portion and an opaque portion, one of said portions being eccentrically disposed relatively to the center of rotation of said disc.

4. A volume sweep generator, including a casing, a photo-electric tube in said casing, a light source for said tube, a substantially transparent and rotatable masking disc positioned between the tube and light source, said disc having a substantially opaque portion the outline of which varies in proportion to volume changes in an engine cylinder during a piston cycle, said portion being eccentrically disposed relatively to the center of the disc, means to connect said disc to the crankshaft of an engine under test for actuation thereby, an opaque partition between said disc and said tube, said partition having a slot therein, means to selectively vary the length of said slot, and said tube being connectable to an indicating apparatus.

RUSSELL J. TINKHAM.

REFERENCES CITED

The following references are of record in the file of this patent:

UNITED STATES PATENTS

| Number | Name | Date |
|---|---|---|
| 1,535,329 | MacGregor-Morris et al. | Apr. 28, 1925 |
| 1,750,242 | Ostrolenk | Mar. 11, 1930 |
| 2,067,262 | Demontvignier | Jan. 12, 1937 |
| 2,227,037 | Schlesinger | Dec. 31, 1940 |
| 2,249,573 | Morse, Jr. | July 15, 1941 |
| 2,277,285 | Woodling | Mar. 24, 1942 |
| 2,283,742 | Leonard | May 19, 1942 |

FOREIGN PATENTS

| Number | Country | Date |
|---|---|---|
| 465,406 | Great Britain | May 3, 1937 |